United States Patent
Qi et al.

(10) Patent No.: US 11,530,348 B2
(45) Date of Patent: Dec. 20, 2022

(54) IONIC LIQUID ENHANCED SURFACTANT SOLUTION FOR SPONTANEOUS IMBIBITION IN FRACTURED CARBONATE RESERVOIRS

(71) Applicant: SAUDI ARABIAN OIL COMPANY, Dhahran (SA)

(72) Inventors: Ziyuan Qi, Beijing (CN); Ming Han, Beijing (CN)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/201,315

(22) Filed: Mar. 15, 2021

(65) Prior Publication Data

US 2022/0290037 A1      Sep. 15, 2022

(51) Int. Cl.
*C09K 8/584* (2006.01)

(52) U.S. Cl.
CPC ..................... *C09K 8/584* (2013.01)

(58) Field of Classification Search
CPC ....................................................... C09K 8/584
See application file for complete search history.

(56) References Cited

U.S. PATENT DOCUMENTS

| 9,296,942 B2 | 3/2016 | Weerasooriya et al. |
| 9,587,168 B2 | 3/2017 | Campbell et al. |
| 9,790,446 B2 | 10/2017 | Miranda Olvera et al. |

(Continued)

FOREIGN PATENT DOCUMENTS

| CN | 101899292 B | 4/2013 |
| CN | 110683991 A | 1/2020 |

(Continued)

OTHER PUBLICATIONS

Behera K, Pandey S. Concentration-dependent dual behavior of hydrophilic ionic liquid in changing properties of aqueous sodium dodecyl sulfate. J Phys Chem B. Nov. 22, 2007;111(46):13307-15. doi: 10.1021/jp076430u. Epub Oct. 30, 2007. PMID: 17967009. (Year: 2007).*

(Continued)

*Primary Examiner* — Aiqun Li
(74) *Attorney, Agent, or Firm* — Osha Bergman Watanabe & Burton LLP (57) ABSTRACT

Provided is a composition that may include a mixture of an ionic liquid and a surfactant in an aqueous composition, where a carbonaceous hydrocarbon-bearing formation has a wettability value and comprises hydrocarbons, where there is an interfacial tension value between the aqueous composition and hydrocarbons present in the carbonaceous hydrocarbon-bearing formation, where the aqueous solution may be configured to modify the wettability value of the carbonaceous hydrocarbon-bearing formation from a first value to a second value that is more water-wet than the first value, and where the presence of the ionic liquid in the aqueous composition may not substantially impact the value for interfacial tension between the hydrocarbons in the carbonaceous hydrocarbon-bearing formation and the aqueous composition. Further provided is a method that may introduce the aqueous composition into a carbonaceous hydrocarbon-bearing formation.

11 Claims, 1 Drawing Sheet

(56) References Cited

U.S. PATENT DOCUMENTS

| | | |
|---|---|---|
| 9,890,316 B2 | 2/2018 | Welton et al. |
| 10,240,447 B2 | 3/2019 | Gupta et al. |
| 2010/0175896 A1 | 7/2010 | Owen |
| 2015/0233223 A1 | 8/2015 | AlAmeri et al. |
| 2016/0060500 A1* | 3/2016 | Kefi .................. C09K 8/22 507/261 |
| 2017/0081583 A1 | 3/2017 | Han et al. |
| 2020/0239762 A1 | 7/2020 | Bittner et al. |

FOREIGN PATENT DOCUMENTS

| | | |
|---|---|---|
| EP | 3556823 A1 | 10/2019 |
| RU | 2588502 C1 | 6/2016 |
| WO | 2009136363 A1 | 11/2009 |
| WO | 2014139037 A1 | 9/2014 |
| WO | 2015122887 A1 | 8/2015 |
| WO | 2018218362 A1 | 12/2018 |
| WO | 2018219654 A1 | 12/2018 |
| WO | 2019028086 A1 | 2/2019 |
| WO | 2019191296 A1 | 10/2019 |

OTHER PUBLICATIONS

Ao, Mingqi et al., "Synthesis and properties of ionic liquid-type Gemini imidazolium surfactants", Journal of Colloid and Interface Science, ScienceDirect, Elsevier Inc., vol. 326, Jul. 2008, pp. 490-495 (6 pages).

Chabba, Shruti et al., "Interfacial and aggregation behavior of aqueous mixtures of imidazolium based surface active ionic liquids and anionic surfactants odium dodecylbenzenesulfonate", Colloids and Surfaces A: Physicochemical and Engineering Aspects, ScienceDirect, Elsevier B.V., vol. 472, Feb. 2015, pp. 9-20 (12 pages).

Chaudhary, Savita et al., "Ionic liquid and surfactant functionalized ZnO nanoadsorbent for Recyclable Proficient Adsorption of toxic dyes from waste water", Journal of Molecular Liquids, 2016, doi:10.1016/j.molliq.2016.10.116 (40 pages).

Chen, Lang G. and Harry Bermudez, "Solubility and Aggregation of Charged Surfactants in Ionic Liquids", Langmuir, American Chemical Society, vol. 28, 2012, pp. 1157-1162 (6 pages).

Comelles, Francesc et al., "Catanionic surfactant formation from the interaction of the cationic surfactant hexadecyltrimethylammonium bromide (CTAB) and the ionic liquid 1-butyl-3-methylimidazolium octyl sulfate (bmim-octyl SO4) in aqueous solution", Colloids and Surfaces A: Physicochemisty Engineering Aspects, <http://dx.doi.org/doi:10.1016/j.colsurfa.2015.07.051> (30 pages).

Tunnish, Ahmed Khalifa, "Study of Ionic Liquids as Effective Solvents for Enhanced Heavy Oil Recovery", University of Regina, Mar. 2017 (272 pages).

Zhao, Yueju et al., "Metal-Organic Framework Nanospheres with Well-Ordered Mesopores Synthesized in an Ionic Liquid/CO2/Surfactant System", Angewandte Chemie, Wiley-VCH Verlag GmbH & Co. KGaA, vol. 123, 2011, pp. 662-665 (4 pages).

* cited by examiner

IONIC LIQUID ENHANCED SURFACTANT SOLUTION FOR SPONTANEOUS IMBIBITION IN FRACTURED CARBONATE RESERVOIRS

BACKGROUND

Oil, natural gas, and other petroleum products are found in carbonate reservoir rock. The porosity of sedimentary carbonate rock reservoirs comprising oil and natural gas is controlled by processes including post-deposition during formation of the rock. These reservoir rocks are known to cement quickly. The quick cementing process is partly due to carbonate minerals in the rock that can form a sediment. New porosity in carbonate reservoirs can be created by processes that also may form sediment, such as dolomitization, dissolution, fracturing, matrix acidification, and other known methods.

Fractured carbonate reservoirs include natural fractures and induced fractures. Fractured carbonate reservoirs are not limited to rocks or minerals including carbonate, limestone, and chalk. Natural fracking networks within the rock can enhance permeability. Induced fracturing can also enhance permeability. Induced fracturing can include hydraulic fracking.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

In one aspect, embodiments disclosed are directed to a composition of a mixture of an ionic liquid and a surfactant in an aqueous composition, where a carbonaceous hydrocarbon-bearing formation has a wettability value and includes hydrocarbons, where there is an interfacial tension value between the aqueous composition and hydrocarbons present in the carbonaceous hydrocarbon-bearing formation, where the aqueous solution is configured to modify the wettability value of the carbonaceous hydrocarbon-bearing formation from a first value to a second value that is more water-wet than the first value.

In another aspect, embodiments relate to the presence of the ionic liquid in the aqueous composition that does not substantially impact the value for interfacial tension between the hydrocarbons in the carbonaceous hydrocarbon-bearing formation and the aqueous composition.

In another aspect, embodiments are directed to a method of introducing an aqueous composition into a carbonaceous hydrocarbon-bearing formation, including hydrocarbons, such that the aqueous composition contacts the carbonaceous hydrocarbon-bearing formation and modifies a wettability value of the carbonaceous hydrocarbon-bearing formation from a first, more oil-wet value to a second, less oil-wet value, thereby releasing at least some of the hydrocarbons from the carbonaceous hydrocarbon-bearing formation into the aqueous composition.

In another aspect, embodiments relate to the aqueous composition having a mixture of an ionic liquid and a surfactant in water, where there is an interfacial tension value between the aqueous composition and hydrocarbons present in the carbonaceous hydrocarbon-bearing formation, and where the presence of the ionic liquid in the aqueous composition does not significantly impact the interfacial tension value.

Other aspects and advantages of the claimed subject matter will be apparent from the following description and the appended claims.

DETAILED DESCRIPTION

In one or more embodiments, a mixture of functional surfactants and ionic liquids are used together as an imbibition agent for chemically enhanced imbibition recovery in oil reservoir rock. The imbibition agent is termed an "ionic liquid enhanced surfactant solution." In one or more embodiments, the ionic liquid enhanced surfactant solution has an effect of altering the wettability capacity of formation rock, such as modifying the wettability of formation material from oil-wet to water-wet. In addition, the ionic liquid enhanced surfactant solution does not see a substantial modification in the interfacial tension reduction provided by the presence of the surfactant in the solution regardless of the presence of the ionic liquid in the solution. Through a reduction in interfacial tension between an aqueous carrier and formation hydrocarbons and the modification of the wettability of the formation, the ionic liquid enhanced surfactant solution provides greatly improved imbibition recovery potential versus water flood or surfactant flood alone.

One or more embodiments of solutions include a surfactant and an ionic liquid. In one or more embodiments, the mixing ratios of the surfactant to the ionic liquid is in a range of from about 1:3 to about 3:1. One or more embodiments of solutions have a total concentration of the mixture of the surfactant and the ionic liquid in water in a range of from about from 0.05 weight percent (wt. %) to 1 wt. %. One or more embodiments of solutions may use any sort of water. In one or more embodiments of methods, the ionic liquid enhanced surfactant solution is introduced into a hydrocarbon-bearing formation such that the wettability of the formation is modified and an interfacial tension between the water and the recovered hydrocarbons is such that imbibition recovery is improved versus a similar composition without the ionic liquid present.

"Surfactant" is a chemical compound that reduces interfacial tension between two phases of matter, for example, between two liquids, between a gas and a liquid, or between a solid and a liquid.

"Imbibition" is the absorption of a wetting phase into a porous rock. As the wetting phase imbibes to the surface of the porous rock, an oil phase is released, or is displaced from the rock.

"Imbibition recovery" refers to recovery of material, such as oil using imbibition techniques.

"Spontaneous imbibition" is the same general process as general "imbibition" except that the imbibition fluid is not pressurized and forced to flow through the subterranean area in the spontaneous variation.

"Oil wet" refers to a solid that generally contacts an oil phase rather than a water or gas phase.

"Water wet" refers to a solid that generally has a thin film of water coating the surface.

"Mix wet" refers to a combination of oil wet and mix wet.

Ionic Liquid Enhanced Surfactant Solution

The chemical imbibition agent of one or more embodiments include a mixture of a surfactant and an ionic liquid.

In one or more embodiments of ionic liquid enhanced surfactant solutions, the carrier fluid is water. The base component of the ionic liquid enhanced surfactant solution can be any form of water, including but is not limited to, fresh water, mineral water, synthetic, filtered and natural sea waters, brackish water, synthetic and natural brines, formation water, and production water. The water may contain a level of organics from natural or artificial sources as long as the function of the ionic liquid enhanced surfactant solution, which is to both modify the wettability of the hydrocarbon-bearing formation and to reduce interfacial tension between the water and the hydrocarbons present in the hydrocarbon-bearing formation, is not inhibited. The water may contain a level of minerals or metals from natural or artificial sources as long as the function of the ionic liquid enhanced surfactant solution is not inhibited.

Surfactants in the ionic liquid enhanced surfactant solution may include classes of alkoxylated compounds, quaternary ammonium salts, organosulfates, alkyl glycosides, and combinations thereof. An example of an alkoxylated compound surfactant is tridecyl alcohol ethoxylated (EO) and propoxylated (PO) sodium acetate, where the EO=8 and the PO=5 (TEPSA). The chemical structure of TEPSA is $C_{13}H_{27}$—(—$CH_2CH_2O$—)$_8$—(—$CH_2CH_2CH_2O$—)$_5$—$CH_2$—COONa. The supplier of TEPSA is Huntsman Singapore Pte Ltd. (150 Beach Road, #37-00 Gateway West, Singapore).

Another example is ethoxylated alcohols, sodium acetate ("X0F109C"). The chemical structure of X0F109C is $C_nH_{2n+1}$(—$CH_2O$)$_m$ $CH_2$—COONa, where XOF109C is a mixture where the n value is between 12 to 16, and m value is between 5 to 8. The supplier of X0F109C is Huntsman International LLC (P.O. Box 4980, The Woodlands, Tex. 77387, USA).

Quaternary ammonium salt surfactant examples include cetyltrimethylammonium bromide (CTAB) and lauryl trimethylammonium bromide (dodecyltrimethylammonium bromide DTAB). Organosulfate surfactants may comprise sodium dodecyl sulfate (SDS). Alkyl glycosides may include decyl glucoside (C8-C10 fatty alcohol glycosides, "APG0810") and lauryl glycoside (C12-C14 fatty alcohol glycosides, "APG1214").

In some instances, multiple functional surfactants classes are provided within a single surfactant. In one or more embodiments, a surfactant with both a quaternary ammonium salt and an organosulfate functionality is used, such as 3-(N,N-dimethyltetradecylammonio)propanesulfonate ("SB3-14").

Ionic liquids include salts with aromatic nitrogenous functionality. Non-limiting examples include imidazolium salt, pyridinium salt, pyrimidinium salt, pyrrolium salt, and indolium salt classes of compounds. Non-limiting examples of imidazolium salt ionic liquids include 1-ethyl-3-methylimidazolium acetate (EMIM Ac), 1-butyl-3-methylimidazolium tetrafluoroborate (BMIM BF4), 1,3-dimethylimidazolium chloride (DMIM Ac), 1-n-butyl-3-methylimidazolium chloride (BMIM Cl), 1-ethyl-3-methylimidazolium tetrafluoroborate (EMIM B F4), 1-ethyl-3-methylimidazolium methyl sulfate (EMIM Ms), 1-ethyl-3-methylimidazolium chloride (EMIM Cl), and combinations thereof.

The previously described ionic liquids and surfactants that are salts will generally pair with counterions. Counterions that may be used are not limited to any one from the group of chlorides, acetates, tetrafluoroborates, sulfates, or combinations thereof. Other counterions of use include iodides, bromides, fluorides, acetates, hexafluorophosphates, sulfates, nitrates and nitrites in limited use, phosphates in limited use, chlorates in limited use, cyanates, and anionic transition metal complexes.

As previously described, the ionic liquid and the surfactant combined are present in the ionic liquid enhanced surfactant solution in an amount in a range of from about 0.05 wt. % to about 1 wt. % of the composition, such as about 0.1 wt. % to about 0.5 wt. %, or from about 0.15 wt. % to about 0.25 wt. %, or about 0.2 wt. %.

Properties of Ionic Liquid Enhanced Surfactant Solution

Inducing spontaneous imbibition occurs in part at the molecular level of the formation material. Adhesive forces that are present in the hydrocarbon-bearing formation include at least an additive property of intermolecular forces. Various intermolecular forces related to rheology govern interactions between the rock surface and natural products, such as oil, natural gas, and formation water. The hydrocarbon-bearing formation similarly will have forces also with artificially introduced materials, including introduced water and solutions. These properties are not limited to surface tension, cohesion, adhesion, wettability, viscosity, capillary action, density, porosity, sorptivity, capillary action, Vander-Waals forces, hydrogen bonding, dispersion, dipole-dipole interactions, and other known chemical rheological properties.

In one or more embodiments, ionic liquid enhanced surfactant solution compositions modify the wettability of the hydrocarbon-bearing formation. The solid phase demonstrates a degree of wettability. "Wettability" is an interaction between the solid phase and a fluid phase. The interaction is usually measured by contacting the solid with a fluid, such as an aqueous fluid, and determining the contact angle between the two. In one or more embodiments, the solid phase is a surface of the rock, mineral, or other reservoir solid. A reservoir may contain both a fluid phase that is, for example, a liquid phase, including water, oil, or both, and a solid phase.

As previously described, a contact angle measurement is used to characterize the wettability of the rock surface with a liquid, usually based upon fresh water. Contact angle is expressed in radian degrees. Contact angles of a "water-wet" surface generally range from 0° to 90°. A water-wet surface strength increases from 90° toward 0°. Contact angles of an "oil-wet" surface generally range from 90° to 180°. An oil-wet surface strength increases from 90° toward 180°. Contact angles equal to 90° are either water-wet or oil-wet. The change in contact angle value caused by a chemical, such as the introduction of the combination of the surfactant and the ionic liquid, has the capacity to alter wettability.

Modification of wettability and interfacial tension are related when describing the use of surfactants to induce chemical enhanced oil recovery imbibition. As previously described, solutions of surfactants alone not only can change the interfacial tension between the aqueous carrier fluid and the hydrocarbons in the formation, but also it can modify to some extent the wettability of the formation by affecting its surface chemistry. In one or more embodiments of formulations, the inclusion of the ionic liquid does not substantially affect the interfacial tension between the aqueous carrier fluid and the hydrocarbons. That is, a similar solution with only the surfactant has a substantially similar interfacial tension value as does one or more embodiments of an ionic liquid enhanced surfactant solution. The non-modification of the interfacial tension is important as surfactants should be used sparingly for a variety of reasons outside the scope of this application.

The enhancement to the significance of change of the wettability of the hydrocarbon-bearing formation upon exposure to the ionic liquid enhanced surfactant solution versus introduction of a similar solution with either the surfactant or the ionic liquid is a surprising and unexpected result. Wettability of the hydrocarbon-bearing formation is often modified slight toward water-wetness upon exposure to a surfactant. Wettability of the hydrocarbon-bearing formation can be modified by introduction of an ionic liquid to the formation—so much so that the formation may change from oil-wet to water-wet immediately. However, and surprisingly, the enhancement of this effect—of not only changing from oil-wet to water-wet but in the degree of water-wetness—occurs when both a surfactant and an ionic liquid are used together, such as in one or more embodiments of an ionic liquid enhanced surfactant solution. This synergy, where the combination of introducing a surfactant and an ionic liquid simultaneously and the degree of water-wetness modification to the hydrocarbon-bearing formation being greater than what would be expected from the introduction of either a solution of the surfactant or a solution of the ionic liquid alone, is unexpected. Although not wanting to be bound by theory, this combinational effect appears to indicate that there is an unexpected "non-overlap" in how the surfactant modifies water-wettability of the hydrocarbon-bearing formation and how the ionic liquid modifies water-wettability of the hydrocarbon-bearing formation such that the change in the wettability of the hydrocarbon-bearing formation is greater than either alone that is not appreciated in the art and is not fully understood.

Relating to solubility properties of the ionic liquid enhanced surfactant solution, salt counterions of ionic liquids and surfactants are presented previously. These counterions may be mixed to achieve a desired solubility of the ionic liquid enhanced surfactant solution in chemical enhanced oil recovery. For example, some combinations of counterions used may increase solubility of the ionic liquid enhanced surfactant solution.

Methods to Use Ionic Liquid Enhanced Surfactant Solution

In one or more embodiments, a method is provided using the ionic liquid enhanced surfactant solution as previously provided for. In one or more embodiments of methods provide for introducing the ionic liquid enhanced surfactant solution into a hydrocarbon-bearing formation. Upon such introduction, the wettability of the hydrocarbon-bearing formation is modified to water wet. This causes elimination of the hydrocarbons from the surface of the hydrocarbon-bearing formation due to contact angle modification from oil-wet to water-wet, permitting water to rush to contact the surface of the formation and occupy the space formerly occupied by the hydrocarbons. The surfactant-containing aqueous solution drives the now-mobilized hydrocarbons towards a producing well or away from an injection well.

In one or more embodiments, the method of use includes the introduction of an ionic liquid enhanced surfactant solution at high temperature conditions and high salinity conditions in real carbonate core plugs or fractured carbonate reservoirs. The ionic liquid enhanced surfactant solution remains operable within a temperature range. A high temperature limit of the temperature range is considered the temperature where the lifetime of ionic liquid or surfactant is no longer useful and degradation rates of the chemicals is faster than imbibition improvement within the reservoir. Ionic liquid salts commonly degrade at temperatures greater than 200° C. In one or more embodiments, the temperature range for use of ionic liquid salts herein is from 85° C. to 110° C.

"High salinity conditions" refers to downhole conditions that are saturated with salt or brine. High salinity conditions may include a saturated solution, a supersaturated solution, or a suspension. High salinity conditions also include a salinity that exceeds the 50,000 parts-per-million (ppm). Extremely high salinity conditions may include a salinity of 100,000 ppm and greater.

In one or more embodiments, "low imbibition recovery" is an imbibition recovery of about 10% or less, or about 5% or less. In one or more embodiments, "medium imbibition recovery" is an average imbibition recovery from about 5% to about 20%, or from about 10% to about 20%, or from about 10% to about 15%. In one or more embodiments, "high imbibition recovery" is an imbibition recovery of about 30% or greater, about 20% or greater, and about 15% or greater. In one or more embodiments, "excellent imbibition recovery" is about 30% or greater.

When the imbibition fluid is introduced into the hydrocarbon bearing formation, the ionic liquid enhanced surfactant solution contacts non water-wet carbonate, the wettability of the contacted formation material is changed from non-water-wet to water-wet, and imbibition occurs. One of skill in the art would appreciate the various engineering methods used to introduce imbibition fluid into a fractured reservoir comprising a hydrocarbon bearing formation.

The methods provided may result in greater observed oil recovery when using an ionic liquid enhanced surfactant solution compared to the oil recovery obtained without introducing the ionic liquid enhanced surfactant solution composition, a surfactant solution used in the ionic liquid enhanced surfactant solution, or the ionic liquid solution used in the ionic liquid enhanced surfactant solution in a hydrocarbon-bearing formation.

EXAMPLES

The following examples illustrate one or more features of the present disclosure. It should be understood that these examples are not intended to limit the scope of the disclosure or the appended claims in any manner.

TABLE 1

Properties of core plugs used in imbibition tests.

| Example | length, cm | diameter, cm | Average porosity, % | Brine permeability, mD |
|---|---|---|---|---|
| Comparative Example 1 | 3.96 | 3.80 | 19.2 | 101 |
| Comparative Example 2 | 4.33 | 3.80 | 27.2 | 680 |
| Comparative Example 3 | 4.30 | 3.80 | 27.0 | 760 |
| Example 1 | 3.91 | 3.80 | 19.0 | 100 |

Comparative Example 1: Imbibition Test Using Seawater

Spontaneous imbibition testing was conducted at 95° C. using natural carbonate cores. The properties for the core plug used are as follows: 3.96 cm (centimeters) length, 3.80 cm diameter, 19.2% average porosity, and 101 millidarcy (mD) brine permeability (Table 1). Before the imbibition test, the carbonate core was first saturated with synthetic connate water, which has a salinity of 214,000 ppm. Afterward, the water saturated core was saturated with crude oil using a centrifugation method to reach an initial oil saturation of 75.0%. The core was then submerged in crude oil and aged for 3 weeks in an air-tight cylinder having an oil-wet state.

Figure 1:
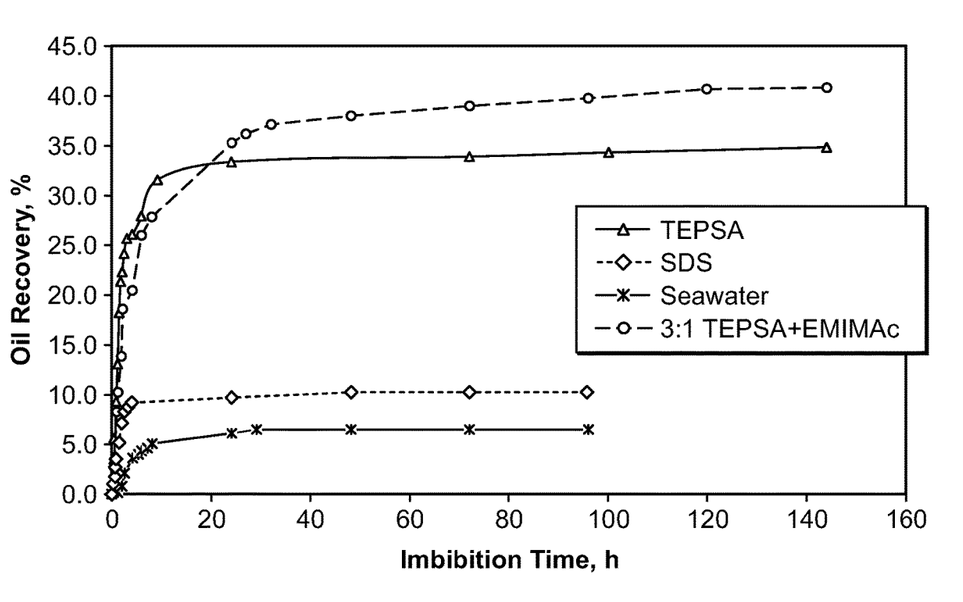
FIG. 1 shows oil recovery (%) versus imbibition time (h) of core imbibition tests, according to one or more embodiments herein.

To simulate water flooding, the synthetic seawater, which has a salinity of 57,670 ppm, was used as an imbibition fluid. The contact angle on the oil-wet carbonate surface in seawater was determined to be 145° (oil-wet), shown in Table 2. The interfacial tension between crude oil and seawater was tested to be 15.4 millinewton per meter (mN/m), shown in Table 4. The oil-saturated core was transferred to an Amott cell filled with seawater, then the Amott cell was put into an oven at 95° C., the oil in the core was washed and spontaneously imbibed with seawater into the rock, thereby producing oil recovery. The oil recovery was calculated by comparing the produced oil volume with the saturated oil volume, provided that the interpolated oil volume is at the same temperature. The imbibition recovery in seawater was measured to be 6.4% of oil in core. The oil recovery curve of Comparative Example 1 is shown plotted in FIG. 1.

Contact angles of examples herein used a goniometry method, measured on carbonate core slices, with a model OCA15 from Dataphysics, Germany. The carbonate core was cut into thin slices with a thickness of 2 millimeter (mm) and polished. The core slices were saturated with connate water and centrifuged at 5,000 revolutions per minute (rpm) for 0.5 hours to saturate with crude oil. The slices were aged in crude oil at 95° C. for 3 weeks to render the surface from water-wet to oil-wet. Before contact angle measurement, the aged slides (slices) were rinsed with synthetic seawater to remove surface oil, then they were introduced into different solutions and the oil droplet was injected beneath the slide and allowed to adhere to the surface. The contact angle was taken from software readings and the measurements were conducted at room temperature, which is generally 20-25° C.

Interfacial tension (IFT) of examples herein were measured using a spinning drop tensiometer (SDT) made by Kruss, Germany. The spinning speed was set at 5,000 rpm and IFT was measured at 90° C. This method of IFT analysis is known to one of skill in the art.

Comparative Example 2: Imbibition Test Using Sodium Dodecyl Sulfate (SDS) Solution A spontaneous imbibition was conducted using a surfactant solution comprising sodium dodecyl sulfate (SDS), which yielded a medium or average oil recovery. These spontaneous imbibition tests were conducted at 95° C. using natural carbonate cores with properties as follows: 4.33 cm length, 3.80 cm diameter, 27.2% average porosity, and 680 mD brine permeability (Table 1). Following the same saturation and aging process as Comparative Example 1, the initial oil saturation was 70.6%.

To simulate a surfactant flooding, the surfactant SDS was dissolved in synthetic seawater as used in Comparative Example 1 with a concentration of 0.2 wt. %. The contact angle using the SDS solution was measured at 113.5° (oil-wet). The interfacial tension between crude oil and the 0.2 wt. % SDS solution was measured to be 1.58 mN/m. The imbibition recovery of the 0.2 wt. % SDS solution was 10.2% of oil in core. The oil recovery curve for Comparative Example 2 is shown plotted in FIG. 1.

Comparative Example 3: Imbibition Test Using Tridecyl Alcohol Ethoxylated and Propoxylated Sodium Acetate (TEPSA) Solution A spontaneous imbibition was conducted using a surfactant solution comprising tridecyl alcohol ethoxylated and propoxylated sodium acetate wherein EO=8 and PO=5 (TEPSA), which yielded high oil recovery. The core specifications are as follows: 4.30 cm length, 3.80 cm diameter, 27.0% average porosity, and 760 mD brine permeability (Table 1). Initial oil saturation was 76.2%.

To simulate surfactant flooding, the surfactant TEPSA was dissolved in synthetic seawater with a concentration of 0.2 wt. %. The contact angle using the 0.2 wt. % TEPSA solution was measured to be 112° (oil-wet). The interfacial tension between crude oil and 0.2 wt. % TEPSA solution was determined to be 0.012 mN/m. The imbibition test was conducted in an Amott cell filled with 0.2 wt. % TEPSA solution at 95° C. The imbibition recovery in the surfactant solution was 34.8% of oil in core. The oil recovery curve for Comparative Example 3 is shown plotted in FIG. 1.

Example 1: Imbibition Test Using Ionic Liquid Enhanced Surfactant Solution

Spontaneous imbibition was conducted to find the imbibition recovery potential of one or more embodiments of the composition. The core properties are as follows: 3.91 cm length, 3.80 cm diameter, 19.0% average porosity, and 100 mD brine permeability (Table 1). The initial oil saturation was 72%.

One or more embodiments of the solution flood was made by dissolving surfactant TEPSA and ionic liquid 1-ethyl-3-methylimidazolium acetate (EMIM Ac) in synthetic seawater with a total concentration of 0.2 wt. % and in a relative concentration ratio of 3:1 TEPSA:EMIM Ac. The contact angle on the carbonate surface after exposure to one or more embodiments of the solution was measured to be 56° (water-wet). The interfacial tension between one or more embodiments of the solution and the hydrocarbons was measured to be 0.011 mN/m. The imbibition test was conducted in an Amott cell filled with the formulation solution at 95° C. The imbibition recovery was 40.8% of oil in core. The oil recovery curve for Example 1 is shown plotted in FIG. 1.

In comparing Comparative Examples 1-3 and Example 1, one or more embodiments of the solution appears to have a similar value in interfacial tension as Comparative Example 3, even though Comparative Example 3 uses 25% more surfactant in the solution than Example 1. In further comparing Comparative Example 3 to Example 1, the modification to wettability between the two is significant, where Example 1 provides the only resulting water-wet surface of any of the four examples. As well, amongst all four examples, Example 1 has the greatest recovery of OOIP (original oil in place).

Comparative Examples 2-5: Interfacial Tension of Surfactant Solutions

The interfacial tension results from the surfactant solutions that were tested at 90° C. are displayed in Table 2. The data show that the 0.2 wt. % surfactant solutions in synthetic seawater (the same synthetic seawater as in Comparative Example 1) range from interfacial tension values of 0.012 mN/m to 1.80 mN/m. Conditions for testing Comparative Examples 4 and 5 were similar to previously described conditions of Comparative Examples 2 and 3. Of the four Comparative Examples, the TEPSA solution shows the least interfacial tension with the hydrocarbons.

TABLE 2

Comparison of interfacial tension results of surfactant solutions.

| Example | Chemical formulation | Interfacial Tension (mN/m) |
|---|---|---|
| Comparative Example 2 | 0.2 wt. % SDS (sodium dodecyl sulfate) | 1.58 |
| Comparative Example 3 | 0.2 wt. % TEPSA (tridecyl alcohol ethoxylated and propoxylated sodium acetate wherein EO = 8 and PO = 5) | 0.012 |
| Comparative Example 4 | 0.2 wt. % CTAB (cetyltrimethylammonium bromide) | 1.18 |
| Comparative Example 5 | 0.2 wt. % DTAB (dodecyltrimethylammonium bromide) | 1.80 |
| Comparative Example 1 | seawater (without surfactant) | 15.4 |

Examples 1-4: Interfacial Tension of One or More Embodiments of Ionic Liquid Enhanced Surfactant Solutions The interfacial tension results from similar ionic liquid enhanced surfactant solutions of the surfactants used in Comparative Examples 2-5 are displayed in Table 3. Each solution is configured to the same as Example 1 where the ratio of surfactant to ionic liquid is 3:1. Example 1 can be compared to Comparative Example 3; Example 2 can be compared to Comparative Example 2; Example 3 can be compared to Comparative Example 4; Example 4 can be compared to Comparative Example 5.

The Example solutions are tested at the same conditions as the Comparative Example solutions. The data show that the solutions in synthetic seawater range from interfacial tension values of the Examples are from 0.011 mN/m to 1.81 mN/m, which for each is similar to the associated Comparative Examples; "similar" in these instances mean an interfacial tension value of +/−0.02 mN/m or alternatively an interfacial tension value greater than or equal to 91.0% of the associated interfacial tension value.

TABLE 3

Comparison of interfacial tension results of ionic liquid enhanced surfactant solutions.

| Example (mN/m) | Chemical formulation | Interfacial Tension |
|---|---|---|
| Example 2 | 0.15 wt. % SDS + 0.05 wt. % EMIM Ac | 1.60 |
| Example 1 | 0.15 wt. % TEPSA + 0.05 wt. % EMIM Ac | 0.011 |
| Example 3 | 0.15 wt. % CTAB + 0.05 wt. % EMIM Ac | 1.20 |
| Example 4 | 0.15 wt. % DTAB + 0.05 wt. % EMIM Ac | 1.81 |

Comparative Examples 2-5: Contact Angle of Surfactant Solutions

The contact angle results from the surfactant solutions that were tested at 25° C. are displayed in Table 4. The data show that the 0.2 wt. % surfactant solutions in synthetic seawater range from contact angle values of 112° to 131°. Conditions for testing Comparative Examples 4 and 5 were similar to previously described conditions of Comparative Examples 2 and 3. Of all the Comparative Examples, the TEPSA solution showed the most chemical modification of wettability from the base value of merely seawater flooding (Comparative Example 1).

TABLE 4

Comparison of contact angle results of surfactant solutions.

| Example | Chemical formulation | Contact angle (°) |
|---|---|---|
| Comparative Example 2 | 0.2 wt. % SDS (sodium dodecyl sulfate) | 113.5 |
| Comparative Example 3 | 0.2 wt. % TEPSA (tridecyl alcohol ethoxylated and propoxylated sodium acetate wherein EO = 8 and PO = 5) | 112 |
| Comparative Example 4 | 0.2 wt. % CTAB (cetyltrimethylammonium bromide) | 120 |
| Comparative Example 5 | 0.2 wt. % DTAB (dodecyltrimethylammonium bromide) | 131 |
| Comparative Example 1 | seawater (without surfactant) | 145 |

Examples 1-4: Contact Angle of One or More Embodiments of Ionic Liquid Enhanced Surfactant Solutions The Example solutions were tested at the same conditions as the Comparative Example solutions. The contact angle results from the associated ionic liquid enhanced surfactant solutions that were tested at 25° C. are displayed in Table 5. The data show that the solutions in synthetic seawater range from contact angle values of 56° to 110°. Conditions for testing Examples 3 and 4 were similar to previously described conditions of Example 1. All the ionic liquid enhanced surfactant solutions showed movement towards a more water-wet contact angle than their associated non-ionic liquid formulations. Of all the Examples, the TEPSA and EMIM Ac solution showed a significant wetness modification not only from its associated Comparative Example 3 but also among all the other Examples. Although not wanting to be bound by theory, the ionic liquid may react on the rock surface when combined with a surfactant, thereby preventing the oil droplet from spreading during test examples.

TABLE 5

Comparison of contact angle results of ionic liquid enhanced surfactant solutions.

| Example | Chemical formulation | Contact angle (°) |
|---|---|---|
| Example 2 | 0.15 wt. % SDS + 0.05 wt. % EMIM Ac | 101 |
| Example 1 | 0.15 wt. % TEPSA + 0.05 wt. % EMIM Ac | 56 |
| Example 3 | 0.15 wt. % CTAB + 0.05 wt. % EMIM Ac | 103 |
| Example 4 | 0.15 wt. % DTAB + 0.05 wt. % EMIM Ac | 110 |

Table 5 shows the contact angle results for the following solutions measured at 25° C. The concentration ratio for surfactant and EMIM Ac is fixed at 3:1 and total concentration is 0.2 wt. % in aqueous solution, similar to the formulation of Example 1.

Examples 1 and 5 and Comparative Examples 3 and 6: Comparison of Contact Angle Results of Ionic Liquid Enhanced Surfactant Solutions at Different Mixing Ratios Imbibition tests were performed with a solution of 0.2 wt. % EMIM Ac in synthetic seawater (Comparative Example 6) to obtain a baseline value of the ionic liquid on altering wettability of carbonate from oil-wet to water-wet. The tests were conducted in an Amott cell filled with the formulation solution at 95° C., under similar conditions to Example 1. The measured contact angle of the EMIM Ac ionic liquid solution was 60.2° (water-wet) and the results are shown in Table 6. The cores used in these examples are carbonate core plugs that have similar lithology.

The relative concentration ratio of surfactant and ionic liquid in the ionic liquid enhanced surfactant solution were tested in Example 5 at 0.1 wt. % TEPSA+0.1 wt. % EMIM Ac in order to view contact angle results with increasing weight percent of ionic liquid in solution compared to Example 1. Test conditions of Example 5 were similar to those conditions of Example 1 and Comparative Example 6. EMIM Ac was tested in Comparative Example 6 without a surfactant, as a positive control. The results are listed in Table 6. The contact angle results of Example 1, Example 5, and Comparative Example 6 show that wettability of all these solutions are within 8.7° from each other)(51.5°-60.2°. Together, Examples 1 and 5 and Comparative Examples 3 and 6 appear show that the ionic liquid enhanced surfactant solution combination can be used with ionic liquid in equal percentage or lower percentage by weight compared to surfactant while retaining a water-wet contact angle. The ionic liquid appears to have a significant and possibly synergetic impact on wettability with the surfactant. Conditions for testing Example 4 were similar to previously described conditions of Example 1. In one or more embodiments, the mixture of TEPSA and EMIM Ac precipitated after 2 hours. Specifically, emulsification was observed during the spontaneous imbibition test using 0.15 wt. % TEPSA+0.05 wt. % EMIM Ac, Example 1. Although not wanting to be bound by any theory, there may be an incompatibility between ionic liquid and surfactant at high temperature and high salinity conditions.

TABLE 6

Contact angle results for mixtures of tridecyl alcohol ethoxylated and propoxylated sodium acetate wherein EO = 8 and PO = 5 (TEPSA) and 1-ethyl-3-methylimidazolium acetate (EMIM Ac) of different mixing ratios.

| Example | Chemical formulation | Contact angle (°) |
|---|---|---|
| Comparative Example 3 | 0.2 wt. % TEPSA | 112 |
| Example 1 | 0.15 wt. % TEPSA + 0.05 wt. % EMIM Ac | 56 |
| Example 5 | 0.1 wt. % TEPSA + 0.1 wt. % EMIM Ac | 51.5 |
| Comparative Example 6 | 0.2 wt. % EMIM Ac | 60.2 |

First, when ionic liquid and surfactant are combined in solution, the ionic liquid does not interfere or interact with the surfactant solution such that the interfacial tension is altered. As previously presented, a similar interfacial tension result means an interfacial tension value of +/−0.02 mN/m or alternatively an interfacial tension value greater than or equal to 91.0% of the associated interfacial tension value. This is shown when comparing Example 1 versus Comparative Example 3. The interfacial tension of Example 1 (0.011 mN/m), wherein an ionic liquid is added to surfactant solution, remains substantially unchanged compared to the interfacial tension of Comparative Example 3 (0.012 mN/m) with only surfactant solution. Similarly, when an ionic liquid is added to the surfactant solution of Example 2 the interfacial tension remains substantially unchanged (1.60 mN/m) compared to the same surfactant solution without the ionic liquid of Comparative Example 2 (1.58 mN/m). The interfacial tension of Example 3 with an ionic liquid added to surfactant solution remains substantially unchanged (1.20 mN/m) compared to the same surfactant solution without the ionic liquid of Comparative Example 4 (1.18 mN/m). The interfacial tension of Example 4 with an ionic liquid added to surfactant solution remains substantially unchanged (1.81 mN/m) compared to the same surfactant solution without the ionic liquid of Comparative Example 5 (1.80 mN/m).

Second, when a surfactant is present in solution the wettability value is altered, specifically decreased, compared to a solution without surfactant. Imbibition without a surfactant in Comparative Example 1 results in a contact angle of 145° on the oil-wet carbonate surface in seawater. When a surfactant is added to the solution, such as SDS in Comparative Example 2, the contact angle decreases from 145° to 113.5° but remains oil-wet. In Comparative Example 3, when another surfactant such as TEPSA is present in solution, the contact angle decreases from 145° to 112° but remains oil-wet. In Comparative Example 4, when a surfactant that is CTAB is present in solution, the contact angle decreases from 145° to 120° but remains oil-wet. In Comparative Example 5, when a surfactant that is DTAB is present in solution, the contact angle decreases from 145° to 131° but remains oil-wet.

Third, each of the tested ionic liquid enhanced surfactant solution compositions have a contact angle that is less than the solution of the surfactant alone. This demonstrates consistency in wettability alteration when the ionic liquid enhanced surfactant solution is used. The difference between contact angles of tested surfactant solutions and ionic liquid enhanced surfactant solutions, from greatest difference to least difference is when TEPSA is used as a surfactant as mentioned previously (56° difference from ionic liquid enhanced surfactant solution of Example 1 to surfactant solution of Comparative Example 3), followed by when DTAB is used as a surfactant (21° difference from ionic liquid enhanced surfactant solution of Example 4 to surfactant solution of Comparative Example 5), next when CTAB is used as a surfactant (17° difference from ionic liquid enhanced surfactant solution of Example 3 to surfactant solution of Comparative Example 4), and last when SDS is used as a surfactant (12.5° difference from ionic liquid enhanced surfactant solution of Example 2 to surfactant solution of Comparative Example 2). These data show that the addition of the ionic liquid to the surfactant solution can effectively improve the wettability alteration capacity. However, the improvement may vary depending on the interaction between surfactant and ionic liquid.

Fourth, when an ionic liquid is added to a surfactant solution, the wettability value is altered from an oil-wet to or toward a water-wet hydrocarbon-bearing formation when using ionic liquid enhanced surfactant solution compared to remaining an oil-wet hydrocarbon-bearing formation with a surfactant solution alone. The oil-wet Comparative Example 3 is altered to water-wet when an ionic liquid is added in Example 1. The oil-wet Comparative Example 5 is altered toward water-wet when an ionic liquid is added in Example 4. The oil-wet Comparative Example 4 is modified toward water-wet when an ionic liquid is added in Example 3. The Oil-Wet Comparative Example 2 is altered toward water-wet when an ionic liquid is added in Example 2.

Last, when the ionic liquid is added to the surfactant solution to form an ionic liquid enhanced surfactant solution a synergistic effect of wettability alteration is exhibited while interfacial tension remains constant. As presented previously, the interfacial tension of a surfactant solution remains a similar interfacial tension result when the ionic liquid is added. Also presented previously, various examples of surfactants alone do not alter a surfactant solution to water-wet. In Table 6, Comparative Example 3 shows that a surfactant solution alone has a contact angle of 112°, Comparative Example 6 shows that an ionic liquid solution alone has a contact angle of 60.2°, and when a surfactant and an ionic liquid are in solution together the contact angle ranges from 51.5°-56°. When an individual surfactant or ionic liquid component is in an aqueous solution by itself, the contact angle measurements range from 60°-112°. When used together in an ionic liquid enhanced surfactant solution, such as Example 1 at 51.5°, the solution contact angle provides for an even greater wettability alteration than either individual component alone. Further, when the concentration of the ionic liquid enhanced surfactant solution components are changed, such as from Example 1 to Example 5 at 56°, the solution contact angle continues to provide for an even greater wettability alteration than the individual components in solution.

In the previous examples, where specified the chemicals were dissolved in synthetic seawater with a salinity of 57,670 parts-per-million (ppm) and a water hardness of 2,760 ppm. The crude oil used was a Saudi Arabian light crude oil; an example of the properties of this oil include a density of 0.8153 grams per centimeter cubed ($g/cm^3$) at 100° C. and the following mass/mass percent concentration of components: 40.57% saturates, 51.39% aromatics, 5.55% resins, 2.09% asphaltenes, and 0.13% acid number in milligrams of potassium hydroxide per gram of oil (mg KOH/g oil).

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

The term "substantially" as used refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Ranges may be expressed as from about one particular value to about another particular value, inclusive. When such a range is expressed, it is to be understood that another embodiment is from the one particular value to the other particular value, along with all particular values and combinations thereof within the range.

Although only a few example embodiments have been described in detail, those skilled in the art will readily appreciate that many modifications are possible in the example embodiments without materially departing from the disclosed scope. Accordingly, all such modifications are intended to be included within the scope of this disclosure as defined in the following claims. In the claims, means-plus-function clauses are intended to cover the structures described as performing the recited function and not only structural equivalents, but also equivalent structures. It is the express intention of the applicant not to invoke 35 U.S.C. § 112, paragraph 6 for any limitations of any of the claims, except for those in which the claim expressly uses the words 'means for' together with an associated function.

What is claimed:

1. A composition, comprising a mixture of an ionic liquid and a surfactant in an aqueous composition,
    where a carbonaceous hydrocarbon-bearing formation has a wettability value and comprises hydrocarbons,
    where there is an interfacial tension value between the aqueous composition and hydrocarbons present in the carbonaceous hydrocarbon-bearing formation,
    where the aqueous composition is configured to modify the wettability value of the carbonaceous hydrocarbon-bearing formation from a first value to a second value that is more water-wet than the first value,
    where the presence of the ionic liquid in the aqueous composition does not substantially impact the value for interfacial tension between the hydrocarbons in the carbonaceous hydrocarbon-bearing formation and the aqueous composition,
    where the ionic liquid has aromatic nitrogenous functionality that is an imidazolium salt selected from the group consisting of 1-ethyl-3-methylimidazolium acetate, 1-butyl-3-methylimidazolium tetrafluoroborate, 1,3-dimethylimidazolium chloride, 1-butyl-3-methylimidazolium chloride, 1-ethyl-3-methylimidazoium chloride, and combinations thereof,
    where the combined amount of the ionic liquid and the surfactant is in a range of from 0.05 wt. % to 1 wt. % of the aqueous composition, and
    where the surfactant and the ionic liquid are in a weight ratio to each other in a range of from about 1:3 to about 3:1.

2. The composition of claim 1, where the surfactant is selected from the group consisting of alkoxylated compounds, quaternary ammonium salts, organosulfates, alkyl glycosides, and combinations thereof.

3. The composition of claim 2, where the surfactant is selected from the group consisting of tridecyl alcohol ethoxylated (EO) and propoxylated (PO) sodium acetate wherein the E0=8 and the PO=5 (TEPSA), cetyltrimethylammonium bromide, lauryltrimethylammonium bromide (dodecyltrimethylammonium bromide), sodium dodecyl sulfate, 3-(N, N-dimethyltetradecylammonio)propanesulfonate, and combinations thereof.

4. The composition of claim 1, where the amount of ionic liquid is less than the amount of surfactant by weight in the aqueous composition.

5. The composition of claim 1, where the first value of wettability for the carbonaceous hydrocarbon-bearing formation is oil-wet and the second value of wettability for the carbonaceous hydrocarbon-bearing formation is water-wet.

6. A method, comprising:
    introducing an aqueous composition into a carbonaceous hydrocarbon-bearing formation comprising hydrocarbons such that the aqueous composition contacts the carbonaceous hydrocarbon-bearing formation and modifies a wettability value of the carbonaceous hydrocarbon-bearing formation from a first, more oil-wet value to a second, less oil-wet value, thereby releasing at least some of the hydrocarbons from the carbonaceous hydrocarbon-bearing formation into the aqueous composition, where the aqueous composition is a mixture of an ionic liquid and a surfactant in water, where there is an interfacial tension value between the aqueous composition and hydrocarbons present in the carbonaceous hydrocarbon-bearing formation, where the presence of the ionic liquid in the aqueous composition does not substantially impact the interfacial tension value between the hydrocarbons in the carbonaceous hydrocarbon-bearing formation and the aqueous composition, where the ionic liquid has aromatic nitrogenous functionality that is an imidazolium salt selected from the group consisting of 1-ethyl-3-methylimidazolium acetate, 1-butyl-3-methylimidazolium tetrafluoroborate, 1,3-dimethylimidazolium chloride, 1-butyl-3-methylimidazolium chloride, 1-ethyl-3-methylimidazoium chloride, and combinations thereof, where the combined amount of the ionic liquid and the surfactant is in a range of from 0.05 wt. % to 1 wt. % of the aqueous composition, and where the surfactant and the ionic liquid are in a weight ratio to each other in a range of from about 1:3 to about 3:1.

7. The method of claim 6, further comprising introducing the composition into the hydrocarbon-bearing formation at a temperature in a range of from about 25° C. to about 120° C.

8. The method of claim 6, further comprising introducing the composition into the hydrocarbon-bearing formation at a temperature in a range of from about 85° C. to about 110° C.

9. The method of claim 6, where the surfactant is selected from the group consisting of alkoxylated compounds, quaternary ammonium salts, organosulfates, alkyl glycosides, and combinations thereof.

10. The method of claim 9, where the surfactant is selected from the group consisting of tridecyl alcohol ethoxylated (EO) and propoxylated (PO) sodium acetate wherein the EO=8 and the PO=5, cetyltrimethylammonium bromide, lauryltrimethylammonium bromide, sodium dodecyl sulfate, and 3-(N,N-dimethyltetradecylammonio) propanesulfonate, and combinations thereof.

11. The method of claim 6, where the second, less oil-wet value is a water-wet value.

* * * * *